(12) United States Patent
Mittal et al.

(10) Patent No.: US 10,965,403 B2
(45) Date of Patent: Mar. 30, 2021

(54) GAP DATA COLLECTION FOR LOW ENERGY DEVICES

(71) Applicant: Landis+Gyr Innovations, Inc., Alpharetta, GA (US)

(72) Inventors: Narinder Mittal, Pradesh (IN); Ursula Moran, Alpharetta, GA (US); Siva Suthram, Chaska, MN (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/783,201

(22) Filed: Feb. 6, 2020

(65) Prior Publication Data

US 2020/0177313 A1 Jun. 4, 2020

Related U.S. Application Data

(63) Continuation of application No. 15/959,598, filed on Apr. 23, 2018, now Pat. No. 10,594,441.

(51) Int. Cl.

| H04L 1/16 | (2006.01) |
| H04L 12/26 | (2006.01) |
| H04Q 9/02 | (2006.01) |
| H04L 29/08 | (2006.01) |

(52) U.S. Cl.
CPC ............ *H04L 1/16* (2013.01); *H04L 43/0847* (2013.01); *H04L 67/12* (2013.01); *H04Q 9/02* (2013.01); *H04Q 2209/60* (2013.01)

(58) Field of Classification Search
None
See application file for complete search history.

(56) References Cited

U.S. PATENT DOCUMENTS

| 5,596,318 A | 1/1997 | Mitchell |
| 2004/0263352 A1 | 12/2004 | Cornwall et al. |
| 2005/0179561 A1 | 8/2005 | Osterloh et al. |
| 2007/0150237 A1 | 6/2007 | Swarztrauber et al. |
| 2008/0071899 A1* | 3/2008 | Odaka ................ H04L 41/06 709/223 |

(Continued)

OTHER PUBLICATIONS

U.S. Appl. No. 15/959,598, "Non-Final Office Action", dated Aug. 5, 2019, 24 pages.

(Continued)

*Primary Examiner* — Chi H Pham
*Assistant Examiner* — Vladislav Y Agureyev
(74) *Attorney, Agent, or Firm* — Kilpatrick Townsend & Stockton LLP

(57) ABSTRACT

A system can include a server and a device having a power source with a limited life span. The server receives data from the device and identifies a gap in the data from the device that indicates that at least a portion of the data from the device is missing. The server uses a gap reconciliation profile associated with the device to control the server to collect the missing data from the device. The server can generate a signal to request the missing data from the device based on the gap reconciliation profile and transmit the signal to the device to collect the missing data based on the gap reconciliation profile. A parameter of the gap reconciliation profile can be used to control generating or transmitting of the signal, which can preserve the limited life span of the power source of the device.

20 Claims, 5 Drawing Sheets

(56) References Cited

U.S. PATENT DOCUMENTS

| | | | |
|---|---|---|---|
| 2008/0313679 A1 | 12/2008 | Ryden et al. | |
| 2013/0028126 A1* | 1/2013 | Kazmi | H04W 72/12 370/252 |
| 2013/0223225 A1 | 8/2013 | Hui et al. | |
| 2013/0303199 A1* | 11/2013 | Siomina | H04L 5/0005 455/456.5 |
| 2014/0036702 A1 | 2/2014 | Van Wyk et al. | |
| 2014/0095864 A1 | 4/2014 | Dasgupta et al. | |
| 2014/0351181 A1 | 11/2014 | Canoy et al. | |
| 2015/0244501 A1 | 8/2015 | Davis et al. | |
| 2015/0256433 A1* | 9/2015 | Sum | H02J 13/00017 709/224 |
| 2016/0021169 A1 | 1/2016 | Chan | |
| 2016/0270056 A1 | 9/2016 | Gupta et al. | |
| 2016/0335409 A1 | 11/2016 | Mensinger et al. | |
| 2017/0111256 A1 | 4/2017 | Neal | |
| 2018/0054800 A1* | 2/2018 | Yeo | H04W 72/08 |
| 2018/0375743 A1 | 12/2018 | Lee et al. | |
| 2019/0342204 A1* | 11/2019 | Chen | H04L 45/18 |
| 2019/0357068 A1* | 11/2019 | Yiu | H04W 76/27 |
| 2020/0118180 A1* | 4/2020 | Kiziuk | G06Q 30/0283 |

OTHER PUBLICATIONS

U.S. Appl. No. 15/959,598, "Notice of Allowance", dated Nov. 18, 2019, 10 pages.
International Patent Application No. PCT/US2019/025548, "International Search Report and Written Opinion", dated Jun. 12, 2019, 12 pages.

* cited by examiner

GAP DATA COLLECTION FOR LOW ENERGY DEVICES

CROSS-REFERENCE TO RELATED APPLICATIONS

This is a continuation of U.S. patent application Ser. No. 15/959,598 entitled "Gap Data Collection for Low Energy Devices" filed Apr. 23, 2018 (allowed), the contents of which are incorporated herein by reference.

TECHNICAL FIELD

The present disclosure relates generally to determining that one or more communications have not been received from a device and collecting missing data or information from the device. More specifically, but not by way of limitation, this disclosure relates to collecting gap data or missing data from a low energy device.

BACKGROUND

A network can include one or more devices or endpoints that can be used to monitor, manage, and/or collect data about the consumption of resources (e.g., electricity, heat, water, gas, etc.). In some instances, the device can communicate data about the monitored resources to another device such as a server (e.g., a headend system) that can collect or store the data.

In some instances, it is possible that certain data will be collected by the device, but the server will not receive all of the collected data due to various reasons such as a hardware or software failure, a network issue, a power outage, etc. For example, the device can be a low energy ("LE") device that is powered or operated by a power source (e.g., a battery) with a limited life span. The life span of the power source can be diminished as the LE device transmits or receives data or signals, which can limit an amount of communication between the LE device and another device such as a parent device (e.g., node) connected to the LE device and the server to route data from the LE device to the server. In this example, each communication between the LE device and the parent device diminishes the life span of the LE device's power source.

Thus, existing systems and methods for collecting data from a device or endpoint such as a low energy device present disadvantages such as, but not limited to, those discussed above and may be unable to retrieve missing data from the device or may be unable to retrieve missing data from the device without depleting the device's power source. For these and other reasons, improved techniques for gap data collection are therefore desirable.

SUMMARY

Covered aspects of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Various examples of the present disclosure provide systems and methods for collecting gap data from a low energy device.

In one example, a method for collecting data from a low powered endpoint ("LPE") in a network, wherein the LPE is communicatively coupled to a parent node and communicates with a server via the parent includes receiving, by a server, a first data communication from the LPE. The data in the first data communication corresponds to a first time within a first time period. The method also includes receiving, by the server, a second data communication from the LPE. The data in the second data communication corresponds to a third time within the first time period. The method further includes identifying, by the server, a first gap between the data in the first data communication and the data in the second data communication. The first gap represents data corresponding to a second time within the first time period. The method also includes generating, by the server, a request to the LPE for the data corresponding to the first gap. The method also includes determining, by the server, a number of previous requests to the LPE for gap data within a reconciliation period. The method further includes determining, by the server, that the number of previous requests to the LPE for gap data within the reconciliation period is within a threshold specified by a gap reconciliation profile associated with the LPE and there is no pending request to the LPE for gap data. The method further includes transmitting, by the server, the request to the LPE for the data corresponding to the first gap.

In another example, a system includes a server and a low powered endpoint ("LPE") communicatively coupled to a parent node to communicate with the server via the parent node. The LPE includes a power source with a limited life span. The server includes a processor and a non-transitory computer-readable medium communicatively coupled to the processor. The processor is configured to receive a first data communication from the LPE. The data in the first data communication corresponds to a first time within a first time period. The processor is also configured to receive a second data communication from the LPE. The data in the second data communication corresponds to a third time within the first time period. The processor is also configured to identify a first gap between the data in the first data communication and the data in the second data communication. The first gap represents data corresponding to a second time within the first time period. The processor is also configured to generate a request to the LPE for the data corresponding to the first gap. The processor is also configured to determine a number of previous requests to the LPE for gap data within a reconciliation period. The processor is also configured to determine that the number of previous requests to the LPE for gap data within the reconciliation period is within a threshold specified by a gap reconciliation profile associated with the LPE and that there is no pending request to the LPE for gap data. The processor is also configured to transmit the request to the LPE for the data corresponding to the first gap.

In another example, a method for collecting data from a low powered endpoint ("LPE") in a network, wherein the LPE is communicatively coupled to a parent node and communicates with a server via the parent node includes receiving, by a server, a first data communication from the LPE. The data in the first data communication corresponds to a first time within a first time period. The method also includes receiving, by the server, a second data communication from the LPE. The data in the second data communication corresponds to a third time within the first time period. The method further includes identifying, by the server, a first gap between the data in the first data communication and the data in the second data communication. The first gap represents data corresponding to a second time within the first time period. The method also includes generating, by the server, a request to the LPE for the data corresponding to the first gap. The method also includes transmitting, by the server, the request to the LPE for the data corresponding to the first gap. The method further includes determining, by the server, a failure of the request to the LPE for the data corresponding to the first gap. The method also includes determining, by the server, whether an amount of time since transmission of the request to the LPE exceeds a minimum retry time period specified by a gap reconciliation profile associated with the LPE. The method also includes transmitting, by the server, a retry request to the LPE for the data corresponding to the first gap in response to determining that the amount of time exceeds the minimum retry period.

The details of one or more aspects and examples are set forth in the accompanying drawings and the description below. Other features and aspects will become apparent from the description, the drawings, and the claims.

DETAILED DESCRIPTION

Figure 1:
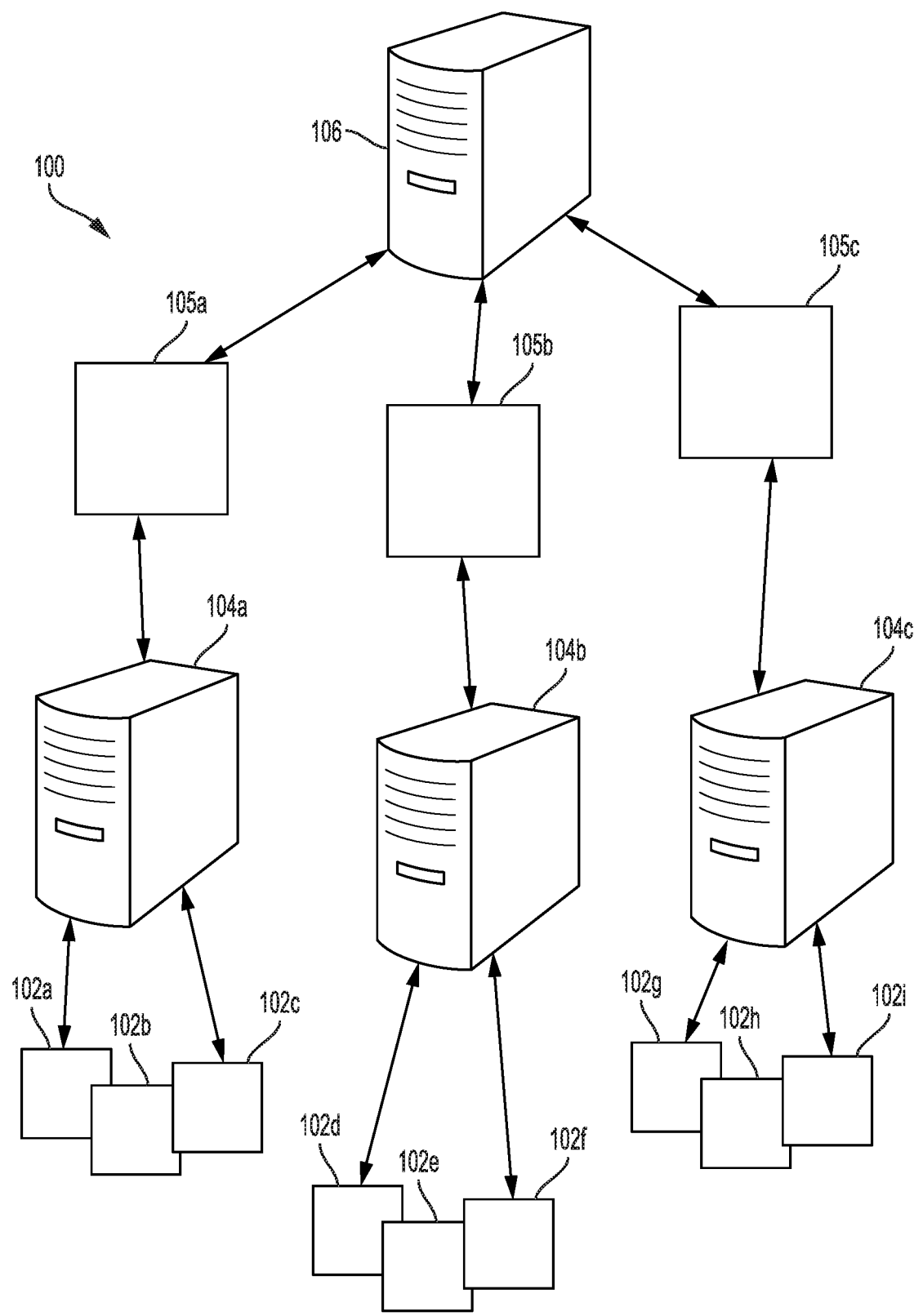
FIG. 1 is an example of a gap data collection system according to one example of the present disclosure.

Certain aspects and features of the present disclosure relate to collecting a gap (e.g., missing data) from a low energy ("LE") device. The LE device can include a device for monitoring, managing, and/or collecting data about the consumption of a resource (e.g., electricity, heat, water, gas, etc.). In some examples, the LE device can be powered or operated by a power source (e.g., a battery). The power source can have a limited life span and the life span of the power source can be diminished as the LE device transmits or receives data or signals. As described above, existing systems and methods for collecting data from a device or endpoint such as a low energy device may not consider ways to minimize the depletion of a LE device's power source when retrieving gap data from the device. Certain examples described herein address these issues by using one or more configurable gap reconciliation profiles or other configurable control data to control a server's (e.g., a headend system) gap data detection, gap data collection, or gap data retry operations with respect to one or more LE devices, which can reduce a number of signals or an amount of data communicated to a LE device and preserve a life span of a power source of the LE device.

In one example, an LE device can monitor a resource and collect data about the resource (e.g., data about the consumption of the resource). A parent device (e.g., an electric meter, router, etc.) can be communicatively coupled to the LE device and the LE device can communicate data about the monitored resource to the parent device. The parent device can receive the data and store the data or transmit the data to one or more servers (e.g., a system such as a headend system) to be collected or stored. In this example, the server can receive the data about the monitored resource and perform various operations based on the data. For example, the server can perform gap detection operations, which can include detecting a gap in the data from the LE device (e.g., missing information about the monitored resource).

Continuing with this example, once the server detects a gap in the data or information received from the LE device, the server can perform one or more operations to attempt to collect at least a portion of the missing information. For example, the server can perform gap data collection operations, which can include transmitting a gap data signal to the LE device requesting the missing information. As still another example, the server can perform gap data retry operations, which can include iterating an attempt to collect the missing information or gap data (e.g., retransmitting a gap data signal or transmitting consecutive gap data signals if the server does not receive the missing information after transmitting an initial gap data signal).

In some examples, the server can be configured to perform gap data collection operations or gap data retry operations based at least in part on a gap reconciliation profile. The gap reconciliation profile can represent data that can be obtained or received by the server (e.g., from a database, from another computing device, or from an indicia of user input). The gap reconciliation profile can indicate one or more parameters that can control or configure the server to perform gap data collection operations or gap data retry operations.

As an example, the gap data reconciliation profile can indicate a maximum number of gap data signals that the server can transmit to one or more LE devices within a particular time period or interval. As another example, the gap data reconciliation profile can indicate a minimum time interval or amount of time between transmission of consecutive gap data signals (e.g., during gap data retry operations in response to determining a failure of a previous request for missing information). As still another example, the gap data reconciliation profile can indicate a maximum number of times that the server can retransmit a gap data signal (e.g. during gap data retry operations). In still another example, the gap data reconciliation profile can indicate a timing criteria for transmitting a gap data signal. For instance, the server can transmit one or more gap data signals to one or more LE devices within a particular gap data time period during the day (e.g., within a four hour time period or any suitable time period). In this example, the gap data reconciliation profile can indicate a particular time or time interval within the gap data time period that the server can transmit a gap data signal to a particular LE device. For example, the gap data reconciliation profile can indicate a relationship or correspondence between an identifier associated with a particular LE device and a particular time or time interval within the gap data time period that the server can transmit a gap data signal to that LE device. In this example, the server can transmit gap data signals to the particular LE device at the particular time associated with the LE device or during a time interval within the gap data time period that is associated with the LE device based on the identifier of the LE device.

In some instances, a gap reconciliation profile, as described above, can be associated with one or more LE devices and the server can be configured to perform gap data collection operations or gap data retry operations with respect to each LE device based on the gap reconciliation profile associated with each LE device. In another example, various groups of LE devices can each be associated with a gap reconciliation profile and the server can be configured to perform gap data collection operations or gap data retry operations with respect to each group of LE devices based on the gap reconciliation profile associated with each group.

In some examples, the server can transmit one or more gap data signals to one or more LE devices (e.g., via various parent devices) to attempt to collect missing or gap data from any suitable time period. As an example, the server can transmit a gap data signal to attempt to collect missing data from a particular day or missing data from various days (e.g., a range of days or dates).

In another example, the server can be configured to perform gap data collection operations or gap data retry operations based on other data received or obtained by the server (e.g., from a database, from another computing device, or from an indicia of user input). For example, the server can be configured to perform gap data collection operations based on control data indicating a minimum amount of time between when the server detects or recognizes a gap in the data received from an LE device and when the server transmits a gap data signal to attempt to collect the missing data from the LE device. In this example, the minimum amount of time can be based on a characteristic of the LE device (e.g., based on a type of the LE device's communication device). As another example, the server can be configured to perform gap data collection operations based on control data indicating a maximum number of gap data signals that the server can transmit to one or more LE devices within a particular time period.

In this manner, on one or more configurable gap reconciliation profiles or other control data can be used to configure a server's performance of various gap data collection or gap data retry operations with respect to one or more LE devices. The configurable gap reconciliation profiles or other control data can cause the server to collect gap data from an LE device while controlling (e.g., reducing) a number of signals transmitted to the LE device, which can preserve a life span of a power source of the LE device. Moreover, in some instances, the one or more configurable gap reconciliation profiles or other control data can cause the server to minimize communication with an LE device (e.g., minimize a number of signals transmitted to the LE device or received from the LE device), which can preserve a life span of a power source of the LE device.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is an example of a gap data collection system (e.g., network) 100 according to one example of the present disclosure. In the example depicted in FIG. 1, the system 100 can be a network that includes one or more devices (e.g., endpoints, data sources, modules, etc.) $102a\text{-}i$. Each device $102a\text{-}i$ can be a device for monitoring, managing, and/or collecting data about the consumption of a resource, such as electricity, heat, water, gas, etc. In some examples, each device $102a\text{-}i$ can include various components for monitoring, managing, and/or collecting data about a resource, storing the data, and communicating the data to one or more other devices. In some instances, one or more of the devices $102a\text{-}i$ can be a low energy ("LE") device that is powered or operated by a power source (e.g., a battery) that has a particular or limited (e.g., depletable) life span. In some examples, each device $102a\text{-}i$ can communicate with one or more devices (e.g., one or more devices in the system 100 or a remote device) using various communication technologies such as, but not limited to, radio frequency (RF), power line communication (PLC), or cellular technologies.

The system 100 can also include one or more collectors $105a\text{-}c$. The collectors $105a\text{-}c$ can communicate with one or more devices (e.g., $104a\text{-}c$; $102a\text{-}i$) in a network using various communication technologies such as, but not limited to, radio frequency (RF), power line communication (PLC), or cellular technologies and with a remote device (e.g., server 106).

In this example, some of the devices $104a\text{-}c$, $105\ a\text{-}c$ (e.g., a computing system, network device, collector device, storage device, electric meter, router, etc.) are parent devices. In some examples, each parent device $104a\text{-}c$, collector $105a\text{-}c$, device $102a\text{-}i$, or the server 106 can include one or more components such as a processor, a bus, a database, a memory, input/output interface components, a display device, communication device, etc. for processing, storing, or communicating data.

In some examples, the devices $102a\text{-}i$ can be communicatively coupled to the parent devices $104a\text{-}c$. As an example, the devices $102a\text{-}c$ can be communicatively coupled to the parent device $104a$, the devices $102d\text{-}f$ can be communicatively coupled to the parent device $104b$, and the devices $102g\text{-}i$ can be communicatively coupled to the parent device $104c$. In this example, the devices $102a\text{-}i$ can monitor a resource, collect data about the resource, and communicate data about the monitored resource to the parent devices $104a\text{-}c$. For example, the device $102a$ monitors consumption of a resource and communicates data about the consumption of the resource to the parent device $104a$. In some instances, the devices $102a\text{-}i$ can transmit data about the monitored resource to the parent devices $104a\text{-}c$ in response to receiving a command signal or a request signal (e.g., from the parent devices $104a\text{-}c$ or another device). In some instances, the devices $102a\text{-}i$ may be enabled (e.g., in an ON or awake mode) or disabled (e.g., in an OFF or sleep mode) for a period of time. Sleep mode may be used by LE devices to conserve power. In this example, the devices $102a\text{-}i$ may receive the command signal or request signal when the device $102a\text{-}i$ is enabled. For example, a device $102a$ can enter an awake mode, receive a command or request signal requesting data about a monitored resource from parent device $104a$, and respond to the command. After responding to the command, device $102a$ may return to sleep mode.

In some examples, the parent devices $104a\text{-}c$ can receive (e.g., obtain) data from the devices $102a\text{-}i$ and store the data (e.g., in a memory of the parent devices $104a\text{-}c$). The parent devices $104a\text{-}c$ can be communicatively coupled to the server 106 to communicate data received from the devices $102a\text{-}i$ to the server 106 to be collected or stored (e.g., in a memory of the server 106).

In some instances, the server 106 can communicate with a collector $105a\text{-}c$ associated with a device $102a\text{-}i$ or parent device $104a\text{-}c$ and the collector $105a\text{-}c$ can in turn communicate with the device $102a\text{-}i$ or the parent device $104a\text{-}c$. For instance, the devices $102a\text{-}i$ can transmit data about a monitored resource to the server 106 via the parent device 104a-c and the collector 105a-c. In this example, each parent device 104a-c associated with devices 102a-i can route data from the devices 102a-i to the collector 105a-c. For instance, the parent device 104a can be associated with the devices 102a-c and the parent device 104a can route (e.g., communicate) data from the devices 102a-c to the collector 105a, which can then transmit the data to the server 106.

In some examples, the server 106 can receive the data about a monitored resource from the parent devices 104a-c and perform various operations based on the data. For example, the server 106 can include a processor and a memory that includes instructions executable by the processor of the server 106. The memory of the server 106 can be any type of memory device or computer-readable storage medium that retains information when powered off. When executed by the processor, the instructions in the memory can cause the processor of the server 106 to perform various operations based on the data received from the devices 102a-i (e.g., via the parent devices 104a-c).

For example, the server 106 can receive data about a resource monitored by the devices 102a-i (e.g., via the parent devices 104a-c) and the processor of the server 106 can analyze the data to determine or recognize (e.g., detect) a gap in the data (e.g., missing information about a monitored resource). In some instances, the processor of the server 106 can identify a gap in data from a device 102a-i if the processor expects to receive data about a resource from the device 102a-i based on a particular schedule (e.g., at predetermined time intervals), but the server 106 has not received the data. In another example, the processor of the server 106 can identify a gap in data from the device 102a-i by comparing the data to data previously received from the device 102a-i. In some examples, the processor of the server 106 does not detect a gap until the server 106 receives a communication from the device 102a-i that occurs after the gap. As an example, the processor of the server 106 may not detect a gap in data from the device 102a-i based on a lack of communication from the device 102a-i. Rather, the processor of the server 106 can detect a gap in the data by comparing data received to historical data received from the device 102a-i. In still another example, the processor of the server 106 can identify a gap in data from the device 102a-i using any suitable method or technique.

In some examples, once the processor of the server 106 identifies a gap in the data received from the devices 102a-i, the processor of the server 106 can execute instructions in the memory of the server 106 to cause the processor to perform various operations to attempt to collect at least a portion of the missing or gap data by performing gap data collection or gap data retry operations. As an example, the processor can detect a gap in data received from the device 102a and cause the server 106 to transmit a gap data signal requesting the missing information from the device 102a. In another example, the processor of the server 106 can execute instructions in the memory of the server 106 to cause the server 106 to iterate or retry an attempt to collect the gap data or missing information from the devices 102a-i. As an example, the processor can cause the server 106 to retransmit a gap data signal or transmit consecutive gap data signals to attempt to collect missing information from the device 102a if the server 106 does not receive the missing information after transmitting an initial gap data signal.

In some examples, the processor of the server 106 can execute instructions in the memory of the server 106 to cause the server 106 to attempt to collect gap data based at least in part on a gap reconciliation profile. The gap reconciliation profile can represent data that can be received or obtained by the server 106 (e.g., from a database, another computing device, or from an indicia of user input). The gap reconciliation profile can indicate or include one or more parameters that can control or configure the server 106 to perform gap data collection operations or gap data retry operations.

As an example, the server 106 can detect a gap in data obtained from the device 102a as described above. A gap reconciliation profile associated with the device 102a can indicate a maximum number of gap data signals that the server 106 can transmit to the device 102a within a particular time period (e.g., within a gap data reconciliation time period). For instance, the gap reconciliation profile can indicate that the server 106 can transmit a maximum or threshold number (e.g., four or any suitable number) of gap data signals to the device 102a within a thirty day period or any suitable number of gap data signals within any suitable time period or interval. In this example, the server 106 can determine whether a number of previous gap data signals transmitted to the device 102a is above, below, or within the threshold and gap reconciliation profile can control the server 106 for transmitting a gap data signal to the device 102a. As an example, the server 106 can transmit a gap data signal to the device 102a in response to determining that the number of previous gap data signals transmitted to the device 102a is below the maximum amount of gap data signals or within a threshold amount. In this manner, the gap reconciliation profile can control the server 106 to prevent the server 106 from transmitting, to the device 102a, an amount of gap data signals beyond the maximum number of gap data signals within a particular time period.

In another example, a gap reconciliation profile associated with one or more devices 102a-i can indicate a minimum time interval or amount of time between transmission of consecutive gap data signals by the server 106 to the one or more devices 102a-i. As an example, the server 106 can transmit a first gap data signal to the device 102a at 11 P.M. In this example, the server 106 can determine or detect a failure of the first gap data signal (e.g., a failure to receive missing or gap data requested by the server 106). Continuing with this example, a gap reconciliation profile associated with the device 102a can indicate a minimum one day interval between transmission of consecutive gap data signals, which can cause the server 106 to delay transmitting another gap data signal to the device 102a based on the one day interval (e.g., delay transmitting another gap data signal until 11 P.M. the following day). For instance, the server 106 can determine whether an amount of time since transmitting the first gap data signal is less than or more than the minimum threshold amount of time of one day. The server 106 can then transmit a retry request signal or another gap data signal to the device 102a in response to determining that the amount of time since transmitting the first gap data signal exceeds the minimum threshold. In this example, the gap reconciliation profile associated with the device 102a can control the server 106 and prevent the server 106 from transmitting a plurality of gap data signals to the device 102a within a short period of time, which can minimize a likelihood of buffer overflow. In some instances, commands from the server 106 (e.g., gap data signals) can be transmitted to the parent devices 104a-c, which can then communicate the commands to the devices 102a-i. In some such examples, the parent devices 104a-c can have a limited buffering capacity and the gap reconciliation profile associated with the devices 102a-i can indicate a minimum time interval or amount of time between transmission of consecutive commands by the server 106, which can minimize a likelihood of buffer overflow.

In some examples, the gap reconciliation profile associated with one or more devices 102a-i can indicate a maximum number of times that the server 106 can retransmit a gap data signal to the one or more devices 102a-i. As an example, a gap reconciliation profile associated with the device 102a can indicate that the server 106 can retransmit a gap data signal to the device 102a a maximum of three times. In this example, the gap reconciliation profile can control the server 106 to prevent the server 106 from transmitting a plurality of gap data signals to a devices 102a that may not be responsive to gap data signals.

In another example, a gap data reconciliation profile associated with the one or more devices 102a-i can indicate a timing criteria for the server 106 to transmit a gap data signal. For instance, the server 106 can transmit one or more gap data signals within a particular gap data time period during the day (e.g., within a four hour time period or any suitable time period). In this example, a gap data reconciliation profile associated with the devices 102a-i can indicate a particular time or time interval within the gap data time period that the server 106 can transmit a gap data signal to a particular device 102a-i. For example, the gap data reconciliation profile can indicate a relationship or correspondence between an identifier associated with a particular device 102a-i and a particular time or time interval within the gap data time period that the server 106 can transmit a gap data signal to that particular device 102a-i. In this example, the server 106 can transmit gap data signals to the particular device 102a-i at the time associated with the device 102a-i or during a time interval within the gap data time period that is associated with the device 102a-i based on the identifier of the device 102a-i. In this example, the gap data reconciliation profile can control the server 106 to allow the server 106 to scatter transmission of gap data signals to devices 102a-i by assigning each device 102a-i a particular time or time interval within the gap data time period based on the identifier of the device 102a-i.

In some examples, a gap reconciliation profile, as described above, can be associated with each device 102a-i and the server 106 can be configured to attempt to collect gap data based on the gap reconciliation profile associated with each device 102a-i. For example, the device 102a can be associated with a first gap reconciliation profile and the device 102b can be associated with a second gap reconciliation profile. In this example, the server 106 can be configured to attempt to collect gap data from the device 102a based on the first gap reconciliation profile and attempt to collect gap data from the device 102b based on the second gap reconciliation profile. In another example, various groups of devices 102a-i can each be associated with a gap reconciliation profile and the server 106 can be configured to attempt to collect gap data from devices 102a-i in each group based on the gap reconciliation profile associated with each group of devices 102a-i. As an example, the devices 102a-c can be in a first group and the devices 102d-f can be in a second group. In this example, the first group of devices 102a-c can be associated with a first gap reconciliation profile and the second group of devices 102d-f can be associated with a second gap reconciliation profile. In another example, a group of devices 102a-i can include any number or types of devices 102a-i. Continuing with this example, the server 106 can be configured to attempt to collect gap data from the devices 102a-c in the first group based on the first gap reconciliation profile and attempt to collect gap data from the devices 102d-f based on the second gap reconciliation profile.

In some examples, the server 106 can transmit one or more gap data signals to one or more devices 102a-i (e.g., via various parent devices 104a-c) to attempt to collect missing or gap data from any suitable time period. As an example, the server 106 can transmit a gap data signal to attempt to collect missing data from the device 102a from a particular day or missing data from various days (e.g., a range of days or dates).

In another example, the server 106 can be configured to perform gap data collection operations or gap data retry operations based on control data received or obtained by the server 106 (e.g., from a database, from another computing device, or from an indicia of user input). For example, the server 106 can be configured to perform gap data collection operations based on control data indicating a minimum amount of time between when the server 106 detects or recognizes a gap in the data received from a device 102a-i and when the server 106 transmits a gap data signal to attempt to collect the missing data from the device 102a-i. In this example, the minimum amount of time can be based on a characteristic of the device 102a-i. For instance, the minimum amount of time can be based on a type of a communication device of the device 102a-i. In this example, the server 106 can delay or time the detection of a gap in data from a device based on a type of a communication device of the device 102a-i. For example, the server 106 may recognize that the device 102a includes a radio frequency ("RF") transceiver and the memory of the server 106 may include data indicating a threshold amount of time between transmission of a command signal to the device 102a requesting data about a resource and when the data is expected to be received. In this example, the server 106 can delay or time gap detection operations or transmission of a gap data signal based on the threshold amount of time (e.g., delay transmitting a gap data signal until after the threshold amount of time). In this example, the control data can prevent the server 106 from transmitting multiple gap data signals to the device 102a-i within a short period of time.

As another example, the server 106 can be configured to perform gap data collection operations based on control data indicating a maximum number of gap data signals that the server 106 can transmit to one or more devices 102a-i in the system 100 within a particular time period. In this example, the control data can prevent the server 106 from transmitting a number of gap data signals above the maximum number of gap data signals indicated by the control data.

In some examples, the server 106 can generate a user interface, which can allow a user to configure parameters of a gap reconciliation profile or other control data. For example, the server 106 may generate a user interface for receiving user input indicating or modifying one or more parameters of a gap reconciliation profile.

In this manner, on one or more configurable gap reconciliation profiles or other control data can be used to configure how the server 106 performs various gap data collection or gap data retry operations with respect to one or more devices 102a-i. The configurable gap reconciliation profile or other control data can cause the server 106 to collect gap data from a device 102a-i while controlling (e.g., reducing) a number of signals transmitted to the device 102a-i, which can preserve a life span of a power source of the device 102a-i.

Although FIG. 1 illustrates a particular arrangement of the system 100, various additional arrangements are possible.

As an example, while FIG. 1 illustrates a certain number of devices 102a-i, parent devices 104a-c, and server 106, the present disclosure is not limited to such configurations. Rather, in other examples, the system 100 may include any suitable number or types of devices 102a-i, parent devices 104a-c, and server(s) 106.

Figure 2:
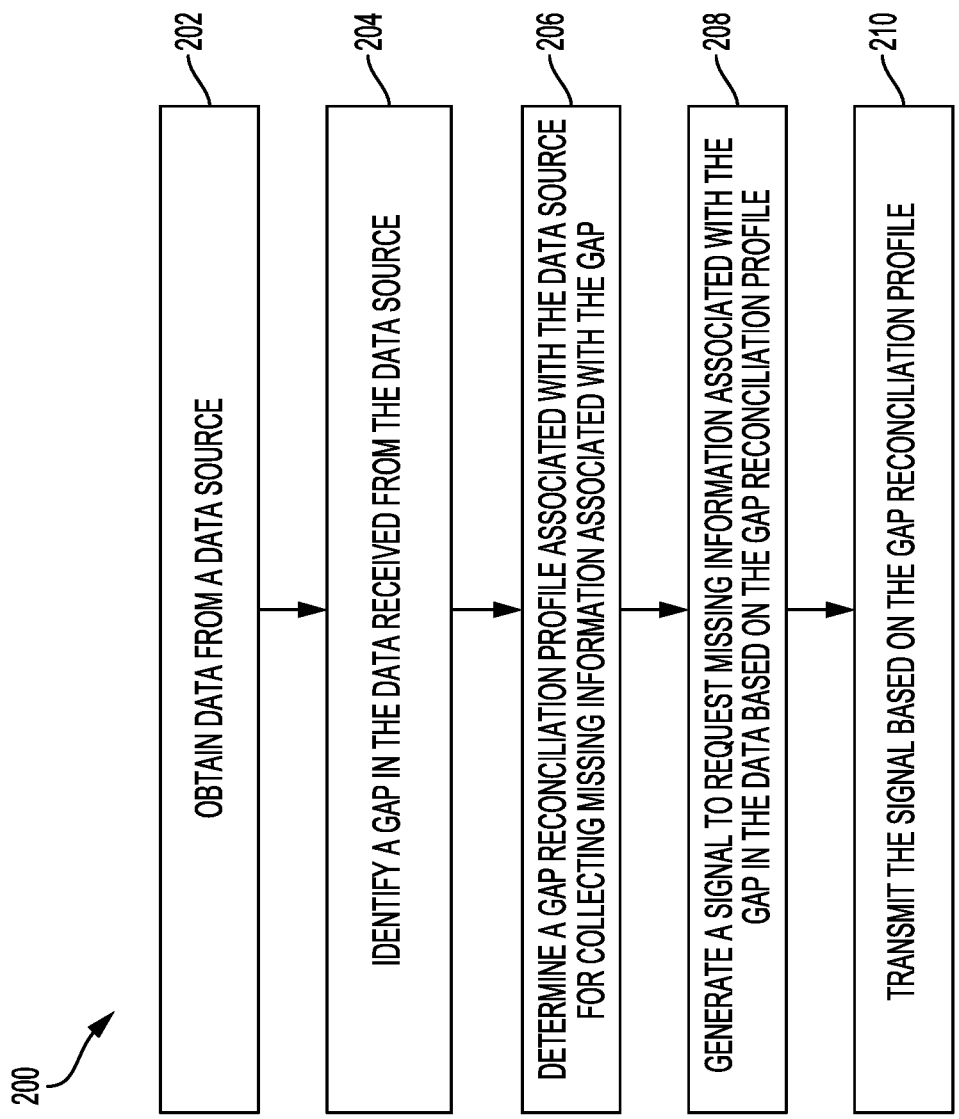
FIG. 2 is a flow chart depicting an example of a process for collecting gap data from a low energy device according to one example of the present disclosure.

FIG. 2 is a flow chart depicting an example of a method 200 for collecting gap data from a low energy device according to one example of the present disclosure. In some examples, the steps in FIG. 2 may be implemented in program code that is executable by a processor, for example, the processor in a general-purpose computer or a server. In some examples, these steps may be implemented by a group of processors or servers. In some examples, one or more steps shown in FIG. 2 may be omitted or performed in a different order. Similarly, in some examples, additional steps not shown in FIG. 2 may also be performed. The method 200 of FIG. 2 is described with reference to FIG. 1, but other implementations are possible.

In block 202 data is obtained from a data source or device 102a-i. In some examples, a server 106 obtains or receives data from the device 102a-i via one or more parent devices 104a-c. For example, the device 102a-i can be any device for measuring consumption of a resource, such as electricity, gas, water, etc. The device 102a-i may measure or receive (e.g., obtain) data, store the data, and communicate the data to a parent device 104a-c. The parent device 104a-c can be communicatively coupled to the server 106 and the parent device 104a-c can transmit the data received from the device 102a-i to the server 106. In some examples, in block 202, the server 106 can receive one or more data sets from the devices 102a-i. For instance, the server 106 can receive a first data set (e.g., communication) from one or more of the devices 102a-i at a first time within a first time period (e.g., a data collection time period). The server 106 can receive a second data set from one or more of the devices 102a-i at a subsequent time within the first time period.

In block 204, a gap in the data received from the device 102a-i is identified, detected, or recognized. In some examples, a processor of the server 106 can execute one or more instructions in a memory of the server 106 to cause the processor to identify a gap in data received from a device 102a-i.

For example, the server 106 can receive data about a resource monitored by the devices 102a-i via the parent devices 104a-c (e.g., in block 202). In some examples, the processor of the server 106 can identify a gap in data from a device 102a-i if the processor expects to receive data about a resource from the device 102a-i based on a particular schedule (e.g., at predetermined time intervals), but the server 106 has not received the data. In another example, the processor of the server 106 can identify a gap in data from the device 102a-i by comparing the data to data previously received from the device 102a-i. In some examples, the processor of the server 106 does not detect a gap until the server 106 receives a communication from the device 102a-i that occurs after the gap. As an example, the processor of the server 106 may not detect a gap in data from the device 102a-i based on a lack of communication from the device 102a-i. Rather, the processor of the server 106 can detect a gap in the data by comparing data received to historical data received from the device 102a-i. As an example, the server 106 can receive a first data set from one or more of the devices 102a-i at a first time within a first time period. The server 106 can receive a second data set from one or more of the devices 102a-i at a third time within the first time period (e.g., after the first time). In this example, the server 106 can identify a gap in the data from the device 102a-i by identifying or recognizing that data corresponding to a second time (e.g., at a time between the first and third times within the first time period) is missing.

In some examples, the processor of the server 106 can identify one or more types of gaps in the data from the device 102a-i. Examples of the types of gaps that can be identified by the processor of the server 106 include, but are not limited to, self-read gaps, interval gaps, and/or event gaps. Self-read gaps are directed to missing data that is associated with a particular time, e.g., missing data associated with a state of a meter which is taken at midnight each night. Interval gaps are directed to missing data that is associated with a particular interval, e.g., missing data associated with a 15 minute interval. Event gaps are directed to missing data that is associated with a particular event. In some implementations, the events may include data-related events, such as self-read data and interval data.

In one example where the devices 102a-i are utility meters, self-read data provides a snapshot of resource consumption that corresponds to a specific time. In one example, the data corresponds to values taken at midnight. The data is sent from the devices 102a-i to the server 106 (e.g., via the parent devices 104a-c) daily, typically randomized between a time interval during the day (e.g., between midnight and 4 a.m.). In this example, the server 106 detects a self-read gap once the server 106 receives a communication that indicates that self-read data for a particular day has not been received from a device 102a-i.

In one example, if the server 106 receives: 1) self-read data for January 12th from the device 102a and 2) self-read data for January 14th from the device 102a, then processor of the server 106 determines that a self-read gap has occurred. The processor of the server 106 determines that there has been a gap because it recognizes that the self-read data for January 13th should have been received prior to the self-read data for January 14th. In another example, if the server 106 receives: 1) self-read data for January 12th from the device 102a, 2) all interval data for January 12th from the device 102a, and 3) interval data for the interval from 8 a.m. to 12 p.m. on January 13th from the device 102a, then the processor of the server 106 determines that a self-read gap has occurred. The processor of the server 106 determines that there has been a gap because it recognizes that the self-read data from January 13th should have been received prior to the interval data for the interval from 8 a.m. to 12 p.m. on January 13th.

In one example where the devices 102a-i are utility meters, the server 106 can obtain interval data from the devices 102a-i and the interval data indicates resource consumption over a fixed period of time. In one example, the data corresponds to consumption over 15 minute intervals or any suitable interval during the fixed period of time. The data is sent from the devices 102a-i to the server 106 (e.g., via the parent devices 104a-c) daily, typically randomized between a time interval during the day. In this example, the server 106 can detect a gap in the interval data if the server 106 receives data for some, but not all, intervals within the fixed period of time. In another example, the server 106 can detect a gap in the interval data if the server 106 determines that an interval gap has occurred because it recognizes that it has not received interval data as expected. In this case, data has been received for an interval, but data is missing for one or more of the prior intervals.

In still another example, a device 102a-i can associate a sequence number with each communication sent from the device 102a-i related to an event. The event may be any type of event, including a metrology event, a communication module event, a self-read data reading, an interval data reading, etc. The server 106 keeps track of the received sequence numbers and recognizes when the sequence numbers indicate that there has been a gap. In one example, the devices 102a-i increment the sequence number by one for each subsequent communication. In this example, the server 106 can detect or recognize an event gap once the server 106 receives a communication that indicates that data for a particular sequence number has not been received. For example, if the server 106 receives: 1) event data with a sequence number of 10 and 2) event data with a sequence number of 12, then the processor of the server 106 determines that an event gap has occurred. The processor of the server 106 determines that there has been a gap because it recognizes that event data with a sequence number of 11 should have been received prior to the event data with a sequence number of 12. The sequence numbering scheme, including the way that the sequence numbers are adjusted by the devices 102a-i for subsequent communications, is not limited to this example.

In block 206, a gap reconciliation profile associated with the device 102a-i is determined for collecting missing information associated with the gap.

For example, a gap reconciliation profile can represent data that can be obtained or received by the server 106 (e.g., from a database, from another computing device, or from an indicia of user input). In this example, a gap reconciliation profile can be associated with each device 102a-i or a group of devices 102a-i and the server 106 can be configured to attempt to collect gap data based on the gap reconciliation profile associated with each device 102a-i or group of devices 102a-i. In some examples, a gap reconciliation profile associated with a device 102a-i or a group of devices 102a-i can be used to control the server 106 for transmitting one or more gap data signals requesting missing data or information associated with an identified gap in data from the devices 102a-i. As an example, a gap reconciliation profile can indicate when the server 106 can generate or transmit a gap data signal to attempt to collect missing information from the device 102a-i, a frequency with which the server 106 can transmit or retransmit gap data signals, etc.

In block 208, the server 106 generates a gap data signal to request missing information associated with the gap in the data based on the gap reconciliation profile. As described above, in some examples, the gap reconciliation profile associated with the device 102a-i can indicate when the server 106 can generate or transmit a gap data signal to attempt to collect missing information from the device 102a-i, a frequency with which the server 106 can transmit or retransmit gap data signals, etc. In this example, the server 106 can generate a gap data signal to be transmitted to the device 102a-i (e.g., via the parent device 104a-c) based on the gap reconciliation profile associated with the device 102a-i. In some examples, in block 208, the server 106 generates a gap data signal to request missing information associated with one or more gaps. For instance, the server 106 can identify various gaps in the data from the device 102a-i (e.g., in block 204). In this example, the server 106 can generate one or more gap data signals to request missing information associated with the various gaps.

In block 210, the server 106 can transmit the gap data signal based on the gap reconciliation profile. In some instances, the server 106 can transmit the gap data signal and a parent device 104a-c can receive the gap data signal. In this example, the parent device 104a-c can transmit the gap data signal to a device 102a-i that is communicatively coupled to the parent device 104a-c to attempt to collect at least a portion of the missing information. For example, the server 106 transmits a gap data signal to attempt to collect a portion of missing data from the device 102a and the device 102a can receive the gap data signal via the parent device 104a. In this example, the device 102a can provide the missing data to the server 106 via the parent device 104a in response to receiving one or more gap data signals.

In some examples, the server 106 can determine whether the device 102a-i provides missing or gap data in response to a gap data signal. In this example, if the missing data is not received in response to a gap data signal, the server 106 can perform gap data retry operations, which can include iterating an attempt to collect the missing information or gap data (e.g., retransmitting a gap data signal or transmitting consecutive gap data signals if the server 106 does not receive the missing information after transmitting an initial gap data signal).

Figure 3:
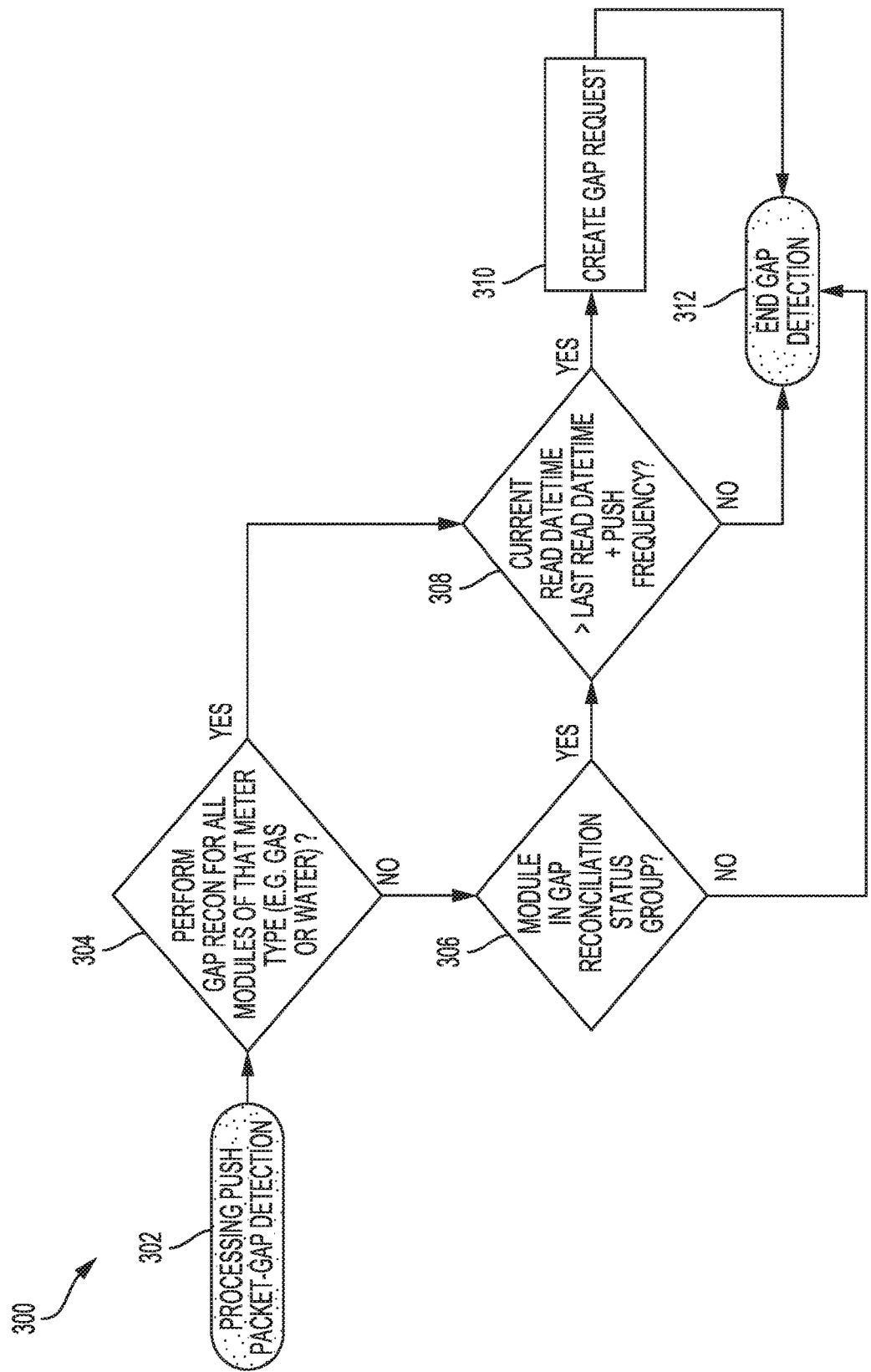
FIG. 3 is a flow chart depicting an example of a process for collecting gap data from a low energy device according to another example of the present disclosure.

FIG. 3 is a flow chart depicting an example of a process for collecting gap data from a low energy device according to another example of the present disclosure. In some examples, the steps in FIG. 3 may be implemented in program code that is executable by a processor, for example, the processor in a general-purpose computer or a server. In some examples, these steps may be implemented by a group of processors or servers. In some examples, one or more steps shown in FIG. 3 may be omitted or performed in a different order. Similarly, in some examples, additional steps not shown in FIG. 3 may also be performed. The method 300 of FIG. 3 is described with reference to FIG. 1, but other implementations are possible.

In block 302, a server 106 begins a gap detection operation, which can include detecting a gap in information or data received from a device 102a-i.

In block 304, the server 106 determines whether to perform gap data reconciliation or collection operations for all devices 102a-i of a particular type. For example, each of the devices 102a-i can be the same or a different type of device such as a gas or water meter. In this example, in block 304, the server 106 can obtain data indicating a type of each device 102a-i and data indicating whether to perform gap data reconciliation or collection for all devices 102a-i of a particular type (e.g., perform gap data reconciliation or collection for all devices 102a-i that are gas meters).

If the server 106 determines at block 304 to perform gap data reconciliation for all devices 102a-i of a particular type, then the Yes branch is followed and the method 300 proceeds to block 308, which is described in further detail below.

If the server 106 determines at block 304 not to perform gap data reconciliation for all devices 102a-i of a particular type, then the No branch is followed and the method 300 proceeds to block 306 and the server 106 determines whether a particular device 102a-i is in a gap reconciliation status group. For example, as described above, in some instances, one or more groups of devices 102a-i can each include any number of devices 102a-i and each group of devices 102a-i can be associated with a gap reconciliation profile. The server 106 can be configured to perform gap data collection operations or gap data reconciliation operations with respect to each group of devices 102a-i based on the gap reconciliation profile associated with each group. In some examples, in block 306, the server 106 can obtain data indicating whether a particular deice 102a-i is included in a group that is associated with a gap reconciliation profile (e.g., obtain data indicating a mapping or relationship of groups of devices 102*a-i*, the devices 102*a-i* in each group, and a gap reconciliation profile associated with each group) and the server 106 can determine whether a particular device 102*a-i* is in a gap reconciliation status group based on the data. If the server 106 determines at block 306 that a device 102*a-i* is not in a gap reconciliation status group, then the method 300 proceeds to block 312 and the server 106 ends gap data detection operations for that device 102*a-i*.

In block 308, the server 106 determines whether a date and time associated with data obtained from a device 102*a-i* is greater than, or after, a date and time associated with previous data obtained from the device 102*a-i*. For instance, the server 106 obtains data from the device 102*a* and the data includes data about a monitored resource, along with a time stamp (e.g., a time stamp indicating a date and time that the device 102*a* collected or measured the information about the resource). In this example, the server 106 can compare the date and time of the data received from the device 102*a* to previous data received from the device 102*a* (e.g., the last reading or measurement of the resource) and a push frequency (e.g., a frequency with which the device 102*a* is expected to transmit data to the server 106) to determine whether the data currently obtained from the device 102*a* is obtained after the server 106 expected to receive data from the device 102*a*.

For instance, as described above, the server 106 can receive data about a resource monitored by the devices 102*a* and the server 106 can identify a gap in data from the device 102*a* if the server 106 expects to receive data from the device 102*a* based on a particular schedule (e.g., at predetermined time intervals or push frequencies), but the server 106 has not received the data.

If the server 106 determines that the date and time associated with data obtained from a device 102*a* is not greater than, or after, a date and time associated with previous data obtained from the device 102*a* or a date and time that the server 106 expects to receive data (e.g., determines that there is no gap in the data from the device 102*a-i*), then the method 300 proceeds to block 312 and the server 106 ends the current gap data detection operations for that device 102*a-i*.

If the server 106 determines that the date and time associated with data obtained from a device 102*a-i* is greater than, or after, a date and time associated with previous data obtained from the device 102*a-i* or a date and time that the server 106 expects to receive data (e.g., determines that there is a gap in the data from the device 102*a-i*), then the method 300 proceeds to block 310.

In block 310 a gap data request is generated or created by the server 106. Generating or creating a gap data request can include generating one or more gap data signals to attempt to collect the missing or gap data from the device 102*a-i*. In some examples, once the server 106 generates or creates a gap request in block 310, the method 300 proceeds to block 312 and the server 106 ends gap data detection operations.

Figure 4:
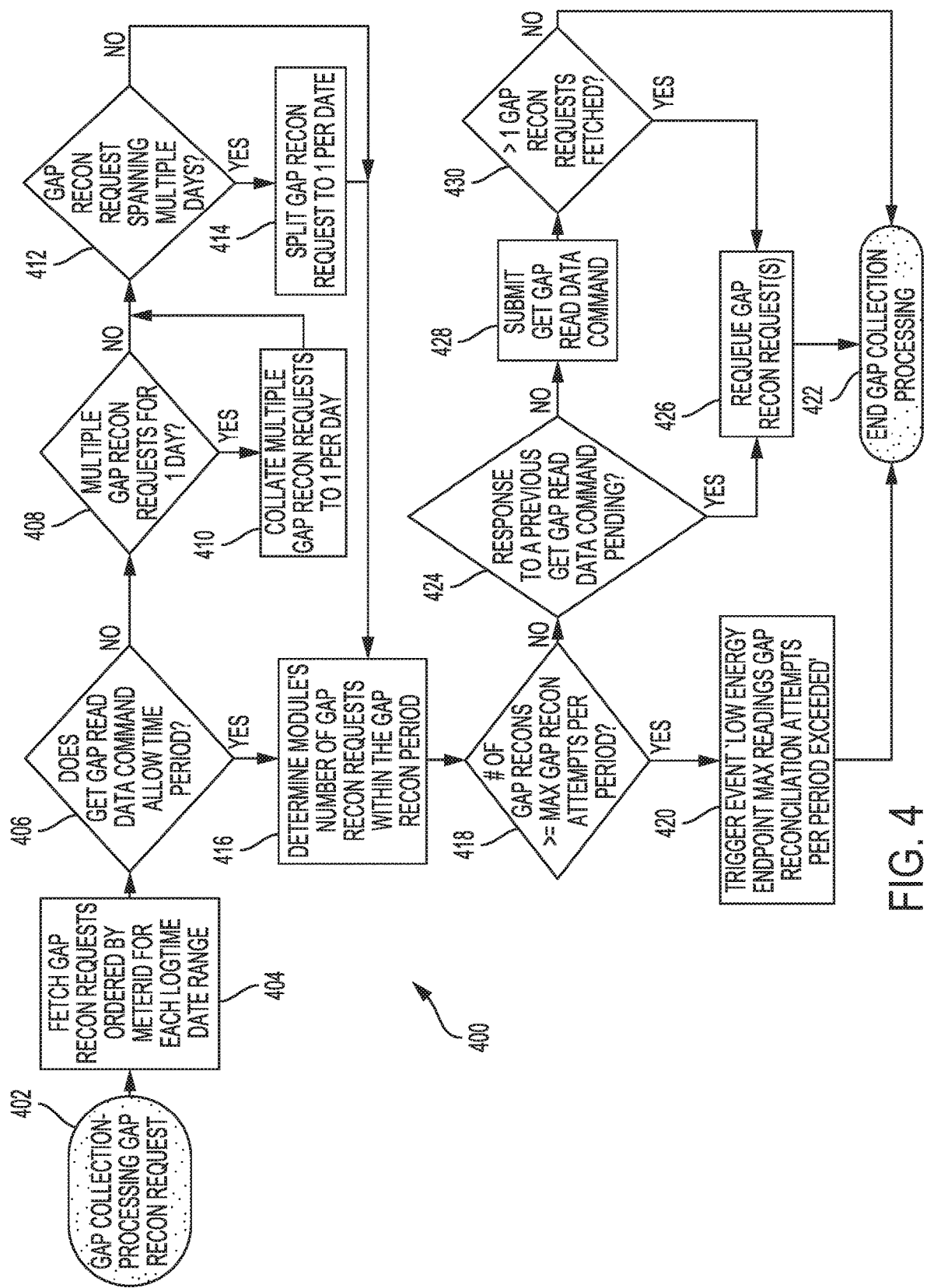
FIG. 4 is a flow chart depicting an example of a process for collecting gap data from a low energy device according to another example of the present disclosure.

FIG. 4 is a flow chart depicting an example of a process for collecting gap data from a low energy device according to another example of the present disclosure. In some examples, the steps in FIG. 4 may be implemented in program code that is executable by a processor, for example, the processor in a general-purpose computer or a server. In some examples, these steps may be implemented by a group of processors or servers. In some examples, one or more steps shown in FIG. 4 may be omitted or performed in a different order. Similarly, in some examples, additional steps not shown in FIG. 4 may also be performed. The method 400 of FIG. 4 is described with reference to FIG. 1, but other implementations are possible.

In block 402, a server 106 begins a gap data collection operation, which can include attempting to collect missing or gap data from a device 102*a-i*. In some instances, the server 106 can begin a gap data collection operation in response to determining, identifying, or recognizing a gap in data obtained or received from the device 102*a-i* (e.g., in block 308 of FIG. 3).

In block 404, the server 106 fetches (e.g., receives or obtains) one or more gap reconciliation requests (e.g., gap data signals), which can indicate a request to collect missing or gap data from the device 102*a-i*. In some instances, the server 106 fetches a gap reconciliation request from a database or from another computing device. In some examples, in block 404, the server 106 generates the various gap reconciliation requests. In some examples, in block 404, the server 106 fetches various gap reconciliation requests for collecting gap data from the devices 102*a-i* and the gap reconciliation requests can be fetched in order based on a meter identifier or other identifier associated with each device 102*a-i*. In additional or alternative examples, the server 106 fetches various gap reconciliation requests and the gap reconciliation requests can indicate a request for collecting gap data from the devices 102*a-i* for a particular time, date, etc. or for a range of dates or days. In this example, the server 106 can fetch the gap reconciliation requests in order based on a meter identifier or other identifier associated with each device 102*a-i* for each date or date range (e.g., fetch the gap reconciliation requests based on the meter identifier and in chronological order for any particular time interval or date range).

In block 406, the server 106 determines whether a gap read data command indicates that gap data can be collected from the device 102*a-i* only for a particular time interval (e.g., a day or date) or that gap data can be collected from the device 102*a-i* for a range of time intervals (e.g., a range of dates or days). If the server 106 determines at block 406 that gap data can be collected from the device 102*a-i* for a range of time intervals, then the method 400 proceeds to block 416, which is described in further detail below.

If the server 106 determines at block 406 that gap data can be collected from the device 102*a-i* only for a particular time or date, then the method 400 proceeds to block 408.

In block 408, the server 106 determines whether multiple gap reconciliation requests (e.g., gap data signals) can be transmitted to a device 102*a-i* for one day or any suitable time period (e.g., one billing time period). In some examples, the server 106 obtains or accesses data indicating a gap reconciliation profile associated with the device 102*a-i* and the gap reconciliation profile can indicate whether multiple gap reconciliation requests can be transmitted to the device 102*a-i* for one day or any suitable time period, as described above.

If the server 106 determines at block 408 that multiple gap reconciliation requests (e.g., gap data signals) can be transmitted to a device 102*a-i* for one day or any single time period, then the method proceeds to block 410.

In block 410, the server 106 can aggregate or collate various gap reconciliation requests to be transmitted to the device 102*a-i* into one gap reconciliation request in response to determining that multiple gap reconciliation requests can be transmitted to the device 102*a-i* for one day or any single time period.

If the server 106 determines at block 408 that multiple gap reconciliation requests (e.g., gap data signals) cannot be transmitted to a device 102*a-i* for one day or any single time period, then the method proceeds to block 412.

In block 412, the server 106 determines whether the gap reconciliation request to be transmitted to the device 102*a-i* requests gap data spanning multiple dates or time periods. If the server 106 determines at block 412 that the gap request to be transmitted to the device 102*a-i* requests gap data spanning multiple dates or time periods, then the method proceeds to block 414. In block 414, the server 106 splits the gap reconciliation request into one gap reconciliation request per date, day, or single time period.

In block 416, the server 106 determines a number of gap reconciliation requests that have been transmitted to a particular module or device 102*a-i* within a gap reconciliation time period. In some examples, the server 106 obtains or access data (e.g., from a database, from another computing device, or from an indicia of user input) that indicates a number of gap reconciliation requests that have been transmitted to the device 102*a-i* within the gap reconciliation time period.

In block 418, the server 106 determines whether the number of gap reconciliation requests that have been transmitted to a particular device 102*a-i* within the gap reconciliation time period is greater than, or equal to, a maximum number of gap reconciliation requests that can be transmitted to the particular device 102*a-i* per gap reconciliation period. In some examples, the server 106 obtains or accesses data indicating a gap reconciliation profile associated with the device 102*a-i* and the gap reconciliation profile can indicate a maximum number of gap reconciliation requests that can be transmitted to the particular device 102*a-i* per gap reconciliation period in substantially the same manner as described above. In this example, the server 106 can compare the number of gap reconciliation requests that have been transmitted to the device 102*a-i* to the maximum number of gap reconciliation requests that can be transmitted to the device 102*a-i* to determine whether the number of gap reconciliation requests that have been transmitted is greater than, or equal to, the maximum number of gap reconciliation requests that can be transmitted to the device 102*a-i* per gap reconciliation period.

If the server 106 determines at block 418 that the number of gap reconciliation requests that have been transmitted is greater than, or equal to, the maximum number of gap reconciliation requests that can be transmitted to the device 102*a-i* per gap reconciliation period, then the method proceeds to block 420.

In block 420, the server 106 may trigger or generate an event (e.g., an alarm) that indicates that the maximum number of gap reconciliation requests that can be transmitted to the device 102*a-i* (e.g., maximum number of gap data signals) per gap reconciliation period has been exceed. In some examples, in block 420, the server 106 can generate a user interface for providing or outputting the event. In another example, the server 106 can provide data indicating the event to a display device for outputting the data.

In block 422, the server 106 ends gap data collection operations for the device 102*a-i*.

Returning to block 418, if the server 106 determines at block 418 that the number of gap reconciliation requests that have been transmitted to the device 102*a-i* is not greater than, or equal to, the maximum number of gap reconciliation requests that can be transmitted to the device 102*a-i* per gap reconciliation period, then the method proceeds to block 424.

In block 424, the server 106 determines whether a response to a previous get gap read data command is pending from the device 102*a-i*. A get gap read data command can be used to refer to a gap reconciliation request or gap data signal. For example, the server 106 can determine whether a response to a previously transmitted gap reconciliation request or gap data signal is pending from the device 102*a-i*. If the server determines at block 424 that a response to a previous gap reconciliation request is pending, then the method 400 proceeds to block 426.

In block 426, the server 106 re-queue's a gap reconciliation request to be transmitted to the device 102*a-i*. For example, if the server 106 determines that a response to a previously transmitted gap reconciliation request or gap data signal is pending from the device 102*a-i* (e.g., in block 424), the server 106 can re-queue or store a gap reconciliation request to be transmitted to the device 102*a-i* (e.g., at a later time). In some examples, once the server 106 re-queue's a gap reconciliation request, the method 200 proceeds to block 422 and the server 106 ends gap data collection operations for the device 102*a-i*.

Returning to block 424, if the server determines at block 424 that a response to a previous gap reconciliation request is not pending, then the method 400 proceeds to block 428.

In block 428, the server 106 submits a get gap read data command. In some examples, a get gap read data command can be used to refer to a gap reconciliation request or gap data signal. As an example, the server 106, in block 428, can generate a gap reconciliation request or gap data signal to be transmitted to the device 102*a-i*.

In block 430, the server 106 determines whether more than one gap reconciliation requests or gap data signals have already been generated, requested, or fetched by the server 106 for a particular device 102*a-i*. In this example, if the server 106 determines that more than one gap reconciliation requests or gap data signals have already been generated or fetched, the method 400 proceeds to block 426 and the server 106 re-queue's the gap reconciliation request or gap data signal generated in block 428.

If the server 106 determines at block 430 that more than one gap reconciliation requests or gap data signals have not already been generated or fetched by the server 106, then the method 200 proceeds to block 422 and the server 106 ends gap data collection operations for the device 102*a-i*.

Figure 5:
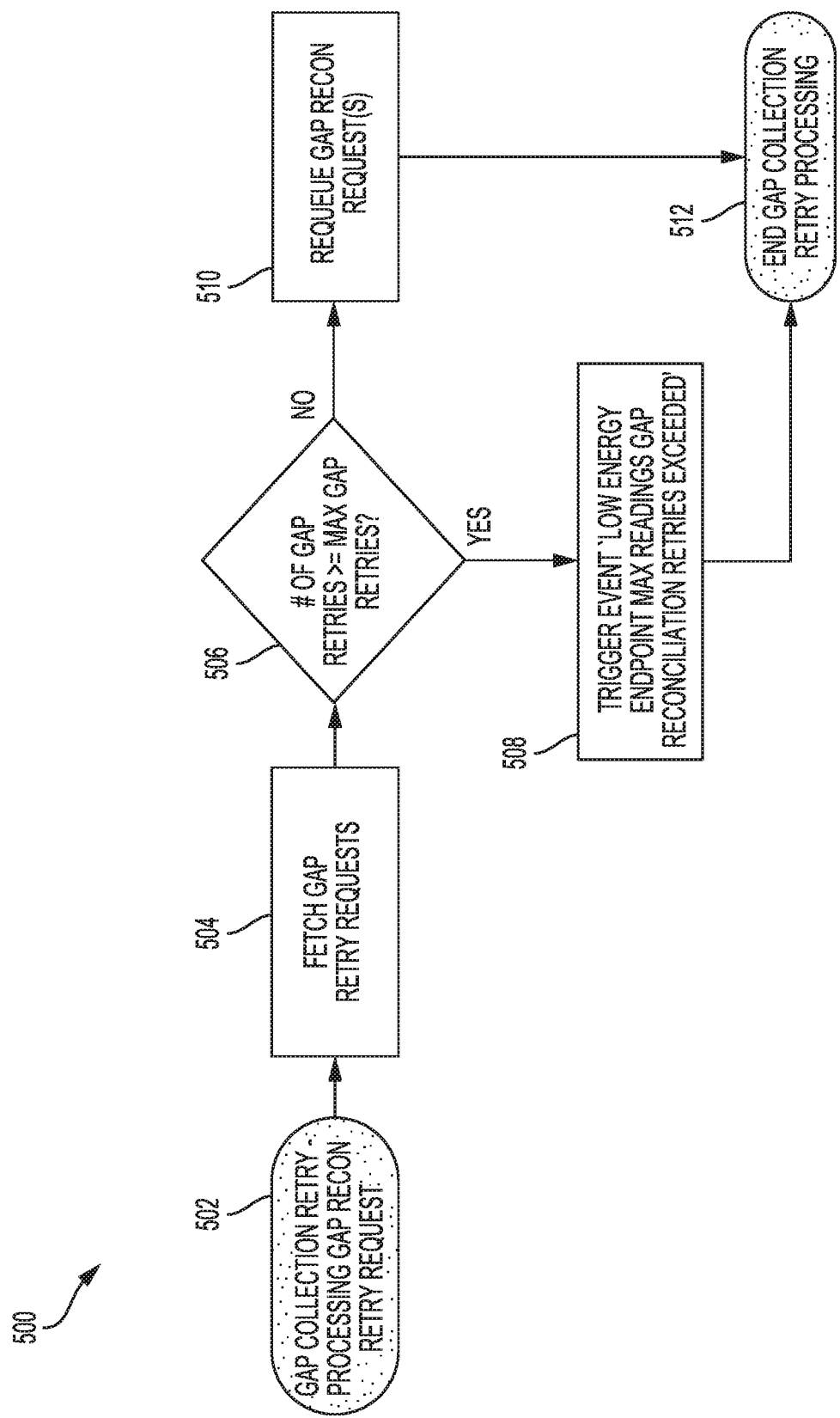
FIG. 5 is a flow chart depicting an example of a process for collecting gap data from a low energy device according to another example of the present disclosure.

FIG. 5 is a flow chart depicting an example of a process for collecting gap data from a low energy device according to another example of the present disclosure. In some examples, the steps in FIG. 5 may be implemented in program code that is executable by a processor, for example, the processor in a general-purpose computer or a server. In some examples, these steps may be implemented by a group of processors or servers. In some examples, one or more steps shown in FIG. 5 may be omitted or performed in a different order. Similarly, in some examples, additional steps not shown in FIG. 5 may also be performed. The process 500 of FIG. 5 is described with reference to FIG. 1, but other implementations are possible.

In block 502, a server 106 begins a gap data retry or gap collection retry operation, which can include iterating an attempt to collect missing information or gap data from the device 102*a-i* (e.g., by retransmitting gap reconciliation requests or gap data signals or transmitting consecutive gap reconciliation requests or gap data signals if the server 106 does not receive the missing information after transmitting an initial gap reconciliation request or gap data signal).

In block 504, the server 106 can fetch (e.g., receive or obtain) one or more gap retry requests, which can indicate a subsequent request to collect missing or gap data from the device 102*a-i* after transmission of an initial request. In some instances, the server 106 fetches a gap retry request from a database or from another computing device. In some examples, in block 504, the server 106 generates various gap retry requests.

In block 506, the server 106 determines whether the number of gap retry requests that have been transmitted to a particular device 102a-i is greater than, or equal to, a maximum number of gap retry requests that can be transmitted to the particular device 102a-i.

For example, the server 106 obtains or accesses data (e.g., from a database, from another computing device, or from an indicia of user input) that indicates a number of gap retry requests that have been transmitted to a particular device 102a-i. In this example, the server 106 obtains or accesses data indicating a gap reconciliation profile associated with the device 102a-i and the gap reconciliation profile can indicate the maximum number of gap retry requests that can be transmitted to the particular device 102a-i. The server 106 can compare the number of gap retry requests that have been transmitted to the device 102a-i and the maximum number of gap retry requests that can be transmitted to the device 102a-i to determine whether the number of gap retry requests that have been transmitted to the 102a-i is greater than, or equal to, the maximum number of gap retry requests.

If the server 106 determines at block 506 that the number of gap retry requests that have been transmitted to the 102a-i is greater than, or equal to, the maximum number of gap retry requests, then the method proceeds to block 508.

In block 508, the server 106 may trigger or generate an event (e.g., an alarm) that indicates that the maximum number of gap retry requests that can be transmitted to the device 102a-i has been exceed. In some examples, in block 508, the server 106 can generate a user interface for providing or outputting the event. In another example, the server 106 can provide data indicating the event to a display device for outputting the data.

In block 512, the server 106 ends gap data retry or gap collection retry operation for the device 102a-i.

Returning to block 506, if the server 106 determines at block 506 that that the number of gap retry requests that have been transmitted to the device 102a-i is not greater than, or equal to, the maximum number of gap retry requests, then the method proceeds to block 510.

In block 510, the server 106 re-queue's a gap reconciliation request to be transmitted or re-transmitted to the device 102a-i. For example, if the server 106 determines that the number of gap retry requests that have been transmitted to the device 102a-i is not greater than, or equal to, the maximum number of gap retry requests (e.g., in block 510), the server 106 can re-queue or store a gap reconciliation request to be transmitted or re-transmitted to the device 102a-i. In some examples, once the server 106 re-queue's a gap reconciliation request, the method 500 proceeds to block 512 and the server 106 ends gap data retry or gap collection retry operation for the device 102a-i.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method for collecting data from a low powered endpoint ("LPE") in a network, the method comprising:
receiving, by a server, a first data communication from the LPE, wherein the data in the first data communication corresponds to a first time within a first time period;
receiving, by the server, a second data communication from the LPE, wherein the data in the second data communication corresponds to a third time within the first time period;
identifying, by the server, a first gap between the data in the first data communication and the data in the second data communication, wherein the first gap represents data corresponding to a second time within the first time period;
generating, by the server, a request to the LPE for the data corresponding to the first gap;
determining, by the server, a timing interval during which a request for data corresponding to a gap can be transmitted to the LPE, wherein the timing interval is specified by a gap reconciliation profile associated with the LPE and is based at least in part on an identifier of the LPE; and
transmitting, by the server, the request to the LPE for the data corresponding to the first gap during the timing interval.

2. The method of claim 1, wherein the LPE is communicatively coupled to a parent node and is configured to communicate with the server via the parent node.

3. The method of claim 1, further comprising:
determining a number of previous requests to the LPE for gap data within a reconciliation period; and
determining that the number of previous requests to the LPE for gap data within the reconciliation period is within a threshold specified by the gap reconciliation profile associated with the LPE, wherein the request to the LPE is transmitted in response to determining that the number of previous requests is within the threshold.

4. The method of claim 1, further comprising:
determining, by the server, a failure of the request to the LPE for the data corresponding to the first gap;
determining, by the server, whether a number of times that the server retransmits the request to the LPE exceeds a maximum number of times that the server can retransmit a request; and
transmitting, by the server, a retry request to the LPE for the data corresponding to the first gap in response to determining that the number of times does not exceed the maximum number of times.

5. The method of claim 1, wherein the gap reconciliation profile associated with the LPE is different from another gap reconciliation profile associated with another LPE.

6. A system comprising:
a server; and
a low powered endpoint ("LPE") capable of communicating with the server, wherein the LPE comprises a power source with a limited life span,
wherein the server comprises:
a processor; and
a non-transitory computer-readable medium communicatively coupled to the processor, wherein the processor is configured to perform operations comprising:
identifying a gap in data communication from the LPE;
generating a request to the LPE for data corresponding to the gap;
determining a gap reconciliation profile associated with the LPE, wherein the gap reconciliation profile associated with the LPE is different from another gap reconciliation profile associated with another LPE;

determining a timing interval during which a request for data corresponding to a gap can be transmitted to the LPE, the timing interval being specified by the gap reconciliation profile associated with the LPE; and transmitting the request to the LPE for the data corresponding to the gap during the timing interval.

7. The system of claim 6, wherein identifying the gap is performed by one or more of:

determining that data that should have been received according to a schedule have not been received;

determining that certain data have not been received by comparing data received in the data communication from the LPE with data previously received from the LPE; or determining that data corresponding to a second time within a time period have not been received from the LPE by determining that data corresponding to a first time and a third time within the time period have been received from the LPE.

8. The system of claim 6, wherein the operations further comprise identifying an additional gap in the data communication from the LPE, wherein generating the request to the LPE further comprises generating the request to the LPE for the data corresponding to the gap and the data corresponding to the additional gap.

9. The system of claim 6, wherein the LPE is communicatively coupled to a parent node and configured to communicate with the server via the parent node.

10. The system of claim 6, wherein the operations further comprise:

determining a number of previous requests to the LPE for gap data within a reconciliation period; and determining that the number of previous requests to the LPE for gap data within the reconciliation period is within a threshold specified by the gap reconciliation profile associated with the LPE, wherein the request to the LPE is transmitted in response to determining that the number of previous requests is within the threshold.

11. The system of claim 6, wherein the gap reconciliation profile associated with the LPE indicates a correspondence between an identifier associated with the LPE and the timing interval.

12. The system of claim 6, wherein the gap reconciliation profile associated with the LPE is associated with a group of LPEs comprising the LPE and the another gap reconciliation profile is associated with another group of LPEs comprising the another LPE.

13. The system of claim 6, wherein the operations further comprise:

receiving an input specifying one or more parameters of the gap reconciliation profile associated with the LPE; and updating the one or more parameters of the gap reconciliation profile.

14. The system of claim 6, wherein the operations comprise:

determining a failure of the request to the LPE for the data corresponding to the gap;

determining whether a number of times that the server retransmits the request to the LPE exceeds a maximum number of times that the server can retransmit a request; and transmitting a retry request to the LPE for the data corresponding to the gap in response to determining that the number of times does not exceed the maximum number of times.

15. A method for collecting data from a low powered endpoint ("LPE") in a network, the method comprising:

identifying, by a server, a gap in data communication from the LPE;

generating, by the server, a request to the LPE for the data corresponding to the gap;

determining, by the server, a gap reconciliation profile associated with the LPE, wherein the gap reconciliation profile associated with the LPE is different from another gap reconciliation profile associated with another LPE;

determining, by the server, a timing interval during which a request for data corresponding to a gap can be transmitted to the LPE, the timing interval being specified by the gap reconciliation profile associated with the LPE; and transmitting, by the server, the request to the LPE for the data corresponding to the gap during the timing interval.

16. The method of claim 15, wherein identifying the gap is performed by one or more of:

determining that data that should have been received according to a schedule have not been received;

determining that certain data have not been received by comparing data received in the data communication from the LPE with historical data received from the LPE; or determining that data corresponding to a second time within a time period have not been received from the LPE by determining that data corresponding to a first time and a third time within the time period have been received from the LPE.

17. The method of claim 15, wherein the LPE is communicatively coupled to a parent node and configured to communicate with the server via the parent node.

18. The method of claim 15, wherein the gap reconciliation profile associated with the LPE indicates a correspondence between an identifier associated with the LPE and the timing interval.

19. The method of claim 15, wherein the gap reconciliation profile associated with the LPE is associated with a group of LPEs comprising the LPE and the another gap reconciliation profile is associated with another group of LPEs comprising the another LPE.

20. The method of claim 15, further comprising:

determining, by the server, a failure of the request to the LPE for the data corresponding to the gap;

determining, by the server, whether a number of times that the server retransmits the request to the LPE exceeds a maximum number of times that the server can retransmit a request; and transmitting, by the server, a retry request to the LPE for the data corresponding to the gap in response to determining that the number of times does not exceed the maximum number of times.

* * * * *